United States Patent [19]

Rüegg et al.

[11] 4,456,653
[45] Jun. 26, 1984

[54] PIN FOR CONNECTING MACHINE ELEMENTS WITH EACH OTHER

[75] Inventors: Christoph Rüegg, Basel; Peter Voirol, Binningen, both of Switzerland

[73] Assignee: Ciba-Geigy Corporation, Ardsley, N.Y.

[21] Appl. No.: 479,343

[22] Filed: Mar. 28, 1983

Related U.S. Application Data

[63] Continuation of Ser. No. 259,393, Jun. 1, 1981, abandoned.

[30] Foreign Application Priority Data

May 9, 1980 [CH] Switzerland ............ 3656/80
Dec. 23, 1980 [CH] Switzerland ............ 9519/80

[51] Int. Cl.³ .............. B32B 15/00; F16C 11/00
[52] U.S. Cl. .................. 428/379; 403/150; 403/221; 403/278; 428/367; 428/372; 428/376; 428/398
[58] Field of Search .......... 428/372, 376, 379, 367, 428/398; 403/150, 151, 152, 221, 228, 278, 279, 355

[56] References Cited

U.S. PATENT DOCUMENTS

| | | | |
|---|---|---|---|
| 378,031 | 2/1888 | Wheeler | 428/379 |
| 2,064,184 | 12/1936 | Stevens | 428/372 |
| 2,806,752 | 9/1957 | Ginn | 309/19 |
| 3,575,787 | 4/1971 | Pietrocini et al. | 161/165 |
| 3,651,661 | 3/1972 | Darrow | 64/1 |
| 3,676,200 | 7/1972 | Rembold et al. | 428/367 X |
| 3,765,978 | 10/1973 | Matt | 156/148 |
| 3,922,882 | 12/1975 | Kimata | 64/2 R |
| 4,311,406 | 1/1982 | Driver | 403/150 X |

FOREIGN PATENT DOCUMENTS

551770 of 1943 United Kingdom .

OTHER PUBLICATIONS

903, Machine Design, vol. 52, No. 10, May 8, 1980, Cleveland, Ohio USA.
McGonegal, Plastic Connecting Rods, Car Craft (1978).

*Primary Examiner*—Lorraine T. Kendell
*Attorney, Agent, or Firm*—Harry Falber

[57] ABSTRACT

In order to provide a pin for connecting machine parts with one another, which is of optimally light weight, the pin is of a compound structure comprising a core of filler-reinforced synthetic plastics resin and a metallic envelope. As filler there are used quartz sand or carbon fibers. The envelope is preferably seated on the core under circumferential tensile bias. The manufacture of the pin takes place, for instance, by pressing the filler and a matrix resin system directly into a suitably prepared envelope.

13 Claims, 4 Drawing Figures

PIN FOR CONNECTING MACHINE ELEMENTS WITH EACH OTHER

This application is a continuation of application Ser. No. 259,393, filed June 1, 1981, now abandoned.

BACKGROUND OF THE INVENTION

The invention relates to a pin for connecting machine elements with each other.

It is known that oscillating machine parts, and especially piston or gudgeon pins are subject to extreme stresses. Hitherto, such machine parts have therefore been manufactured almost exclusively of steel and are correspondingly heavy, which is disadvantageous in various aspects of their use. In one aspect the weight of these parts is contrary to the trend of light weight construction modes, and, in another one, other parts cooperating with these heavy parts, such as, for instance, crankshafts, bearings, etc., are subjected to correspondingly greater stress due to the large inertia forces involved, and must therefore be more resistant and be dimensioned correspondingly heavier. Moreover, the masses of rapidly oscillating engine parts also influence the quality of the running of the engine and its development of noise.

OBJECTS AND SUMMARY OF THE INVENTION

It is therefore an object of the present invention to provide a piston pin which is much lighter than pins of a known kind which have comparable mechanical properties. A further object of the invention aims at providing a method for the manufacture of such a pin.

The first object is attained in accordance with the invention by a pin for connecting machine elements with each other, which is characterized by the fact that it is of composite structure comprising a metal shell and a core therein, which core consists essentially of fully hardened, oil-fast matrix system of synthetic resin material and a reinforcement of filler material incorporated in said system, said core being full-bodied or a hollow body, preferably of annular configuration with a central bore or passage therethrough, which latter is preferably parallel with the pin axis.

The metal shell is preferably a metal sleeve of prismatic shape which is open at both ends, and the cross section of which can be rounded, especially circular or elliptic, or it can be polygonal. A circular diameter is preferred.

Preferably, the core consists of a fully cured matrix system which is high temperature-resistant and oil-fast and comprises embedded therein in a first embodiment, high-module fibers, having an elasticity module, in longitudinal direction, of at least about 200,000 up to 400,000, preferably at least about 350,000 N/mm². Particularly suitable are carbon fibers, especially short fibers such as pitch fibers, for example those of the Type P-65S marketed by Union Carbide.

The proportion of the core volume constituted by reinforcing fibers should be as high as possible with the view of attaining a high elasticity module of the core, in particular in a direction transverse to the longitudinal pin axis. This proportion is advantageously at least about 55 volume %, and preferably at least about 65 to 70 volume-%.

At least a preponderant portion of the reinforcing fibers is preferably oriented substantially vertically to the pin axis; the length of the reinforcing fibers is preferably essentially of about to 5 to 50%, and more preferredly 15 to 25% of the diameter of the pin.

In a second embodiment of the pin according to the invention, the matrix system of the core has embedded therein a particulate, especially a granular filler; the filler can be quartz sand or amorphous quartz (silica glass), finely ground quartz, corundum, glass beads or chips, or metal grains or chips. In order to obtain the same high proportion of filler as set forth above for fibrous fillers, it may be desirable to use filler particles of different grain sizes.

The content of filler is preferably so large that the thermal expansion coefficient of the core is substantially equal to, and more preferably somewhat smaller, than that of the shell. At room temperature, the metal shell is preferably under a circumferential bias which is of such magnitude that it is relatively small but above zero even at the highest operational temperature to be expected.

Matrix systems which are suitable for incorporation in the core of the pin according to the invention and are uncured or slightly pre-cured at introduction into the core shell, must be systems whose glass transition temperature or softening temperature, when fully cured, is higher, by a determined, system-specific safety interval, than the highest operational temperature expected to occur in the pin. When the pin is to be used as a piston pin (gudgeon pin) in an internal combustion engine, the last-mentioned temperature is at about 180° to 200° C. Moreover, the matrix resin must be oil-fast at the above-mentioned high temperature, as it will come into contact, as a rule, with the lubricating oil in the engine, so that the elasticity module of the pin will be maintained at the required high level.

Thus, suitable cured matrix systems are, for example, epoxide resin systems, polyimide systems, phenol- or cresol-formaldehyde resin systems or systems of an acetylenically unsaturated aromatic hydrocarbon or imide resin having glass transition temperatures above 200° C., and preferably above 250° C. Thus, the matrix system can be a mixture of (a) polyfunctional epoxide resins and
(b) at least one hardener as well as optionally
(c) at least one catalyst, wherein there can be, for example, (a) triglycidylisocyanurate,
1,1,2,2-tetra(4-glycidyloxy-phenyl)-ethane,
1,1,3-tri(4-glycidyloxy-phenyl)-propane,
epoxynovolak,
N,N,N',N'-tetraglycidyl-4,4'-diaminodiphenylmethane or
N,N,O-triglycidyl-p-hydroxyaniline;
(b) methylnadic anhydride (methyl-norbornen-2,3-dicarboxylic anhydride),
nadic anhydride (norbornen-2,3-dicarboxylic phthalic anhydride, /anhydride),
benzophenone tetracarboxylic dianhydride,
pyromellitic dianhydride,
hexahydrophthalic anhydride,
maleic anhydride,
diaminodiphenylmethane or
diaminodiphenylsulfone; and
(c) N-methylimidazole, 2-phenylimidazole, other imidazole derivatives or
N,N-dimethyl-benzylamine.

Especially suitable combinations of monomers affording preferred examples of epoxide resin systems are mixtures of triglycidyl isocyancurate with methylnadic anhydride, hexahydrophthalic anhydride or methylhexahydrophthalic anhydride, optionally together with a catalyst such as N,N-dimethylbenzylamine or 1-methyl-imidazole.

A combination of triglycidyl-p-hydroxyaniline with diaminodiphenylsulfone is also very suitable as an unpolymerized monomer-and-catalyst matrix system.

There will now be described a number of certain selected epoxide resin systems whose most important properties are given in the Table 1 below. The epoxide monomers, hardeners and catalysts in this table which afford these systems are designated by the following abbreviations:

| TGIC | triglycidylisocyanurate |
|---|---|

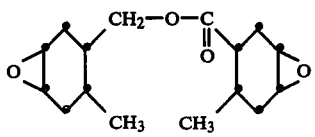

| TGMDA | N,N,N',N'—tetraglycidyl-methylenedianiline |
|---|---|
| TPGE | 1,1,2,2-tetra(4-glycidyloxy-phenyl)-ethane |
| BGDT | (bisphenol A)-diglycidylether (standard epoxide resin) |
| DDM | diaminodiphenylmethane |
| MNA | methylnadic anhydride |
| MI | 1-methylimidazole |
| BMI | |

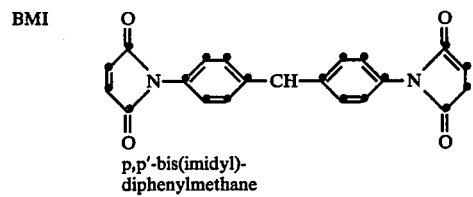

p,p'-bis(imidyl)-diphenylmethane

| DABA | O,O'—diallyl-bisphenol A |
|---|---|
| DAPA | 2,6-diallylphenol |
| ANOL | allynovalak (viscosity about 1500 millipascal · sec) |
| DETDA | diethyltoluylene diamine |
| SR 351 | trimethylolpropane trimethacrylate |
| J 403 | C—C—unstable initiator on the base of tetraphenylethane marketed by Akzo Chemie, Nederland BV |
| BT3103 | imid resin system on the base of BMI + aryl-biscyanate marketed by Mitsubishi Gas Chemical Co., Inc., Japan |
| TGpHA | triglycidyl-p-hydroxyaniline |

TABLE 1

Properties of some unreinforced epoxide resin systems

| | Example Nr. | | | | |
|---|---|---|---|---|---|
| | 0 | 1 | 2 | 3 | 4 |
| Resin (parts by weight) | TGMDA(80) + BGDA(20) | TGIC(100) | CYCLO(100) | TPGA(50) + CYCLO(50) | TGIC(65) |
| hardener (parts by weight) | MNA(92) | MNA(169) | MNA(115) | MNA(104) | DDM(46) |
| catalyst (parts by weight) | MI(0.5) | MI(0.5) | MI(1) | MI(1) | — |
| Properties after hardening 8 h 220° C | | | | | |
| glass transition point $T_G$(DTA), °C. | 249° | 270° | 251° | 265° | 272° |
| Young's modulus (ISO 178) $E_B$ at 200° C., N/mm$^2$ | 1955 ± 19.5 | 2200 ± 80 | 591 ± 64 | 729 ± 48 | 798 |
| Flexural strength $\Sigma_B$ at 200° C., N/mm$^2$ | 61.5 ± 3 | 61 ± 18 | 37.6 ± 8.6 | 22.4 ± 6.8 | 25.7 |
| oil occlusions at 180° C.* | | | | | |
| 30 days, $E_B$ at 200° C., N/mm$^2$ | 2023 ± 95 | 3636 ± 117 | 2275 ± 151 | 2301 ± 74 | 1790 ± 45 |
| $\Sigma_B$ at 200° C., N/mm$^2$ | 44.3 ± 53 | 68.3 ± 9.4 | 86.3 ± 5.6 | 65.5 ± 11 | 73.8 ± 1 |
| weight change, % | −0.86 | −0.8 | −0.62 | −0.8 | — |
| aspect | unchanged | unchanged | unchanged | unchanged | unchanged |
| 60 days, $E_B$ at 200° C., N/mm$^2$ | zu weich | 3460 ± 100 | 2070 ± 64 | 2299 ± 54 | 1675 ± 118 |
| $\Sigma_B$ at 200° C., N/mm$^2$ | | 76.4 ± 11 | 74 ± 4.4 | 71.6 ± 7.8 | 51.6 ± 13.6 |
| weight change, % | −13.1 | −1.0 | −1.4 | −1.5 | −3.5 |
| aspect | deformed bubbles | unchanged | unchanged | unchanged | unchanged |
| evaluation: | unstable | excellently stable | usable | well stable | limited stability |

*each time five test bodies of the dimensions (in mm) 80 × 10 × 4 immersed in multiple range motor oil Valvoline SAE 10-50

A particularly preferred uncured matrix system consists of a mixture of 100 parts by weight of triglycidyl isocyanurate, about 130 to 190 parts by weight of methylnadic anhydride and optionally from 0 to about 4 parts by weight of a catalyst.

In another preferred embodiment an uncured matrix system is an imide system, of which 40 to 70 parts by weight consist of p,p'-bis(imidyl)-diphenylmethane of the formula

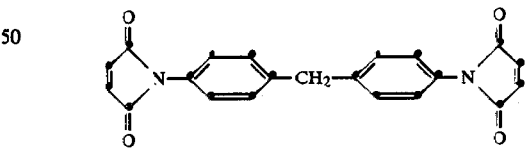

In the last-mentioned uncured matrix system the imide can be mixed with a share, preferably amounting to 60 to 30 parts by weight, of another monomer which is a (polyfunctional allyl) cyanate or aryl cyanate acting simultaneously as a reactive thinner, and optionally further compounds of low viscosity such as an acrylate or methacrylate having an aliphatic di- to tetrahydric alcohol moiety and/or an aromatic diamine.

As an example of the class of polyimides which is suitable for use in the pin according to the invention, there is preferred a pressure-molded mass slightly precured from a monomer combination of bismaleic imide and diaminodiphenylmethane of the formula

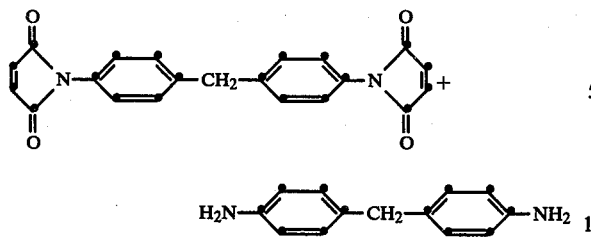

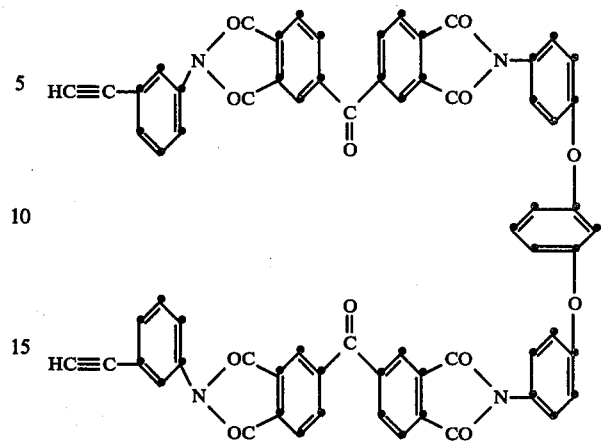

Further examples are given in Table 2, infra.

Imide monomer formulations of low viscosity which contain allyl compounds such as, e.g., diallyl-bisphenol A are preferably hardened with an initiator having an unstable C-C bond which initiator is decomposed into chemical radicals when heated. Preferred are di- or tetra-phenylethane compounds of the general formula

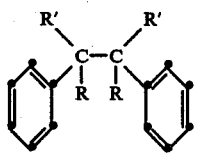

wherein
R is —OH, —CN or —O—CH$_3$,
R' is —phenyl or —COOR", and
R" is lower alkyl, phenyl or benzoyl.

It was found that, while it was generally believed that epoxide resins would be oil-fast, surprisingly only relatively few of the high temperature-resistant, highly reticulated epoxide systems were resistant to engine lubricating oils at, e.g. 180° C. Suitable oil-fast epoxide resins were found to be especially those defined hereinbefore.

The method according to the invention which is used to manufacture a pin of the above-described construction comprises introducing the uncured monomeric or pre-cured, fully hardenable matrix system and filler

TABLE 2

Properties of some oil-fast, unreinforced imide resin formulations

| | Example Nr. | | | | |
|---|---|---|---|---|---|
| | 5 | 6 | 7 | 8 | 9 |
| Monomers | | | | | |
| Imide (parts by weight) | BMI (50) | BMI (60) | BMI (60) | BMI (70) | BMI (22.5) |
| ally compound (parts by weight) | DABA (50) | DAPA (40) | DAPA (35) | ANOL (30) | BT 3103 (7.5) |
| other Co-monomers (parts by weight) | — | — | SR 351 (5) | DETDA (10) | quartz (70) |
| initiator | J 403 (0.5) | J 403 (0.5) | J 403 (0.5) | J 403 (0.5) | — |
| glass transition point $T_G$ °C. | undefined | 241° | undefined | 266° | undefined |
| flexural strength $\sigma_B$ at 200° C. N/mm$^2$ | 58 ± 7.4 | 63.6 ± 5.1 | 90.8 ± 3 | 86 ± 15.5 | 69 + 4 |
| Young's modulus (ISO 178) $E_B$ at 200° C.; N/mm$^2$ | 2560 ± 87 | 1780 ± 49 | 2460 ± 56 | 2407 ± 99 | 9000 ± 139 |
| oil occlusions at 180° C.+ | | | | | |
| 30 days, $\sigma_B$ at 200° C., N/mm$^2$ | 93.2 ± 9.6 | 52.6 ± 8.6 | 63.4 ± 11.6 | 81.2 ± 15.7 | 61.4 ± 5.1 |
| $E_B$ at 200° C., N/mm$^2$ | 3206 ± 59 | 3102 ± 37 | 3084 ± 110 | 2994 ± 40 | 9486 ± 537 |
| weight change, % | −0,41 | −0,65 | −0,6 bis 0,65 | −0,57 bis 0,63 | −0.19 |
| 60 days, $\sigma_B$ at 200° C., N/mm$^2$ | 89 ± 11 | 54 ± 5.5 | 71 ± 17 | 89 ± 18 | |
| $E_B$ at 200° C., N/mm$^2$ | 3440 ± 68 | 3336 ± 94 | 3333 ± 92 | 3254 ± 39 | |
| weight change, % | −0.34 | −0.63 | −0.63 | −0.65 | |
| aspect | mottled brown, o.k. | dark brown o.k. | mottled brown, o.k. | brownish red o.k. | turbid, brown, o.k. |
| evaluation: | excellent | stable | stable | excellent | stable |

The class of acetylenically unsaturated imide resin systems comprises, for instance, the substance marketed by Gulf Oil Chemical Co. under the name of Termid ® for which the following structure is given:

directly into the finished metal shell or sleeve and to harden it therein, preferably at a temperature ranging from 160° to 220° C. More in particular, the metal sleeve can be held in a mold the cavity of which has a width which is slightly larger than the outer diameter of the preferably cylindrical sleeve by a determined amount. The unhardened matrix system together with a filler is then introduced into the sleeve under such pressure, corresponding to the thickness of the shell, that the latter is widened to completely fill the mold, and the whole is held under that pressure preferably with heating until the resulting core is completely hardened, whereupon the whole is cooled down to room temperature, whereby the sleeve surrounds the hardened core with circumferential bias.

In a specially preferred mode of carrying out the method of the invention in practice, there is used as the matrix system a pre-cured resin which is solid at room temperature and a hardener of the same property; the matrix system and a filler are then melted down together and the resulting melt is allowed to re-solidify to obtain a preformed core fitting snugly into the hollow interior of the sleeve; this preformed core is then introduced into the metal sleeve and hardened therein with heating and under pressure.

BRIEF DESCRIPTION OF THE DRAWING

Further details and objects of the invention will become apparent from the further description thereof with reference to the accompanying drawing, in which.

DETAILED DESCRIPTION OF THE EMBODIMENTS SHOWN IN THE DRAWING

Figure 1:
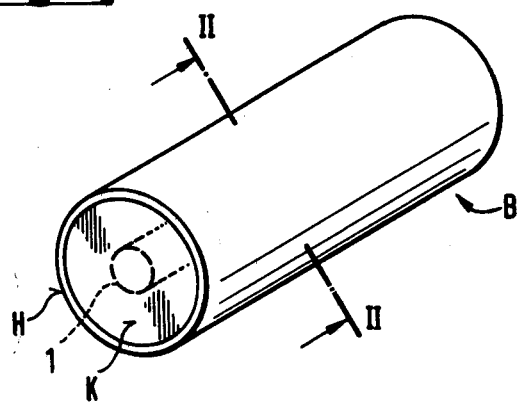
FIG. 1 is a perspective view of a preferred embodiment of the pin according to the invention.

The pin B which is shown in FIG. 1 is a compound body consisting of a sysnthetic plastics resin core K and a metal shell H being in the shape of a cylindrical sleeve of circular cross section.

A circle illustrated by a dashed line indicates that the core K can have a hollow interior 1, i.e. it can be a full cylindrical body or a hollow body having a longitudinal bore therethrough.

The core K consists of a high temperature-resistant and oil-fast synthetic resin matrix system in which there are embedded granular fillers or so-called high module fibers F. An embodiment containing the latter is shown in FIG. 3.

In a fiber-reinforced core K (shown in FIG. 3) the reinforcing fibers are preferably essentially oriented in planes extending radially relative to the longitudinal pin axis A, fibers deviating from this orientation being possible or even desirable particularly in the peripheral zone of the core.

Figure 3:
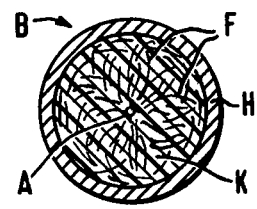
FIG. 3 is a cross-sectional view similar to that of FIG. 2, but of a different embodiment of the pin.

In the particular fiber-containing structure shown schematically in FIG. 3, the fibers are in an arrangement in which they constitute struts inside the metal shell H which impart to the entire pin B a very high rigidity in radial direction.

Figure 2:
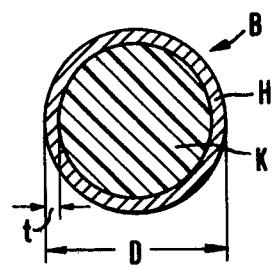
FIG. 2 is a cross-sectional view of the same embodiment taken in a plane indicated by II—II in FIG. 1.

The wall thickness t (FIG. 2) of the metal shell H depends on the physical properties of the core K. In the above-described core structures, wall thicknesses of about 1 to 10%, and preferably 3 to 6% of the pin diameter D have been found to be most suitable.

Preferably, the shell H is subject to a determined circumferential tensile bias. This bias is preferentially such that it does not completely disappear even at the highest operational temperature of the pin to be expected during use. It is thereby guaranteed that the core and the shell will always be firmly connected with one another under all circumstances. This bias can be produced, for instance, by causing the shell to shrink on the correspondingly prepared core.

The manufacture of the pin B can also be carried out in several ways. Thus, the core K and the shell H can each be made completely and separately, and the shell H can then be combined with the core K by being shrunk thereon. Preferably, however, the core is produced directly inside the shell, by introducing an unhardened or not completely hardened matrix system and the reinforcing fibers therefor into the correspondingly prepared shell and hardening them inside the latter.

The manufacture of the core,—be it independently of the shell or directly inside the shell—can also be carried out by various modes of operation. Thus pressurizing, injection molding, vacuum injection or centrifugal casting methods can be applied.

A particularly advantageous manufacturing method will now be described at the hand of FIG. 4, in which method the core is formed by compression directly inside the shell.

The suitably prepared shell H is placed in a mold M having a bottom part 11 and a sidewall 12. The internal diameter D' of the mold M is by definition larger than the outer diameter of the shell H. On top of the mold M and registering with the shell H there is provided a pressure cylinder 13 in which a piston 14 is arranged for upward and downward displacement. The piston 14 is provided with driving means (not shown) and the mold M is equipped with heating means (not shown).

Initially, the piston 14 is withdrawn from the pressure cylinder 13 and a core mass 15 consisting of matrix system and filler is filled into the shell H and the pressure cylinder 13. This can be done by first introducing the filler and subsequently impregnating it with the matrix system (e.g. the epoxide resin formulation No 1 shown in the Table 1); or a pressure mass can be used which already contains the filler. In particular, this pressure mass can be a pre-formed cylindrical body. Such a preformed body can be produced, for instance, by melting down, at a temperature well below reaction temperature a resin and a hardener which are both solid at room temperature, and then filling the melt together with the filler under moderate pressure into the mold and letting it solidify therein. Now, the piston 14 is inserted into the cylinder 13 and the core mass is subjected to pressure. During the application of pressure, the filled-in material is densified and compacted. When fibers are used as fillers, then, during compression, the fibers which are relatively short compared with the inner shell diameter will orient themselves essentially vertically relative to the shell axis, i.e. parallel to the frontal face of the piston 14, as has been illustrated in FIG. 3. Due to the applied pressure, the shell H is simultaneously widened until its diameter equals the internal width D' of the mold, thereby generating the above-mentioned circumferential tensile bias. Thereupon while maintaining the pressure, the core mass is hardened under the conditions of temperature required for the specific matrix system used.

Compared with those methods in which the core is manufactured separately, the above-described manufacturing method has the advantage of being less complicated and requiring no special treatment of the inner wall surface of the shell.

When a cylindrical mandrel (not shown) is rigidly mounted on the bottom 11 of the mold M centrally and axially relative to the sleeve 15 and protruding to the same height as the latter, then a core K is obtained which is provided with a central passage 1. Of course such passage 1 can also be produced as a bore by drilling it through a full-bodied core K.

EXAMPLE OF A PISTON PIN CORE

Epoxide resin/hardener mixture I 100 g TGMDA
110 g MNA
0.25 g MI

Filler Mixture II

ELMIN Quarzgut EL 180 (an amorphous quartz marketed by the Swiss company of Sihelco AG of Birsfelden, Switzerland)

| Amount (in g) | Grain size range (in mm) |
|---|---|
| 38 | 0.355 to 2 |
| 12 | 0.25 to 0.71 |
| 12 | 0.125 to 0.355 |
| 13 | EL 180 (95% of which pass through a sieve of 180 micrometer hole size) |

Figure 4:
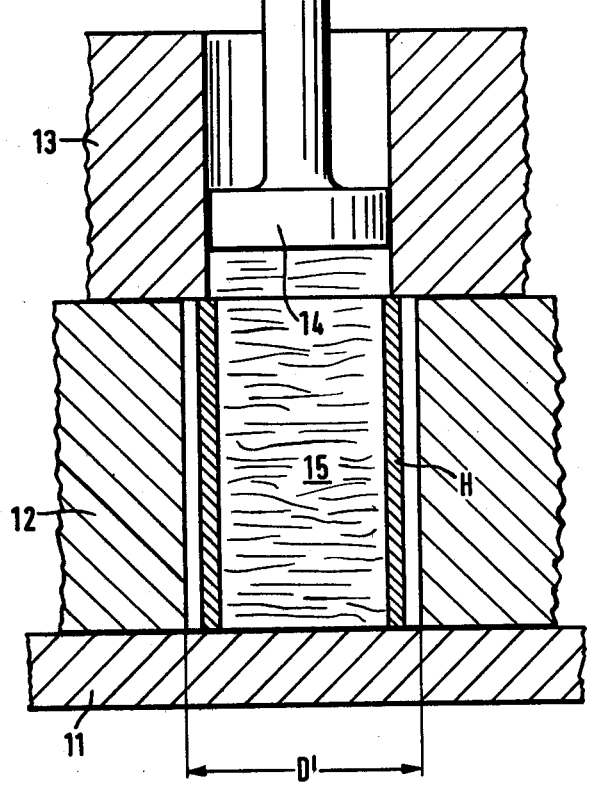
FIG. 4 is a schematic sectional view of an apparatus for manufacturing an embodiment of a pin as shown in FIGS. 1 to 3, in accordance with a preferred mode of the method according to the invention.

A mixture III consisting of 20 weight-% of Component I and 80 weight-% of Component II was filled into a gudgeon pin shell at a temperature of 60° to 90° C. and tamped down therein, whereupon it was compressed with a suitable die piston in a pressurizing apparatus of the type shown in FIG. 4.

There was, for instance, obtained a cylindrical piston pin (gudgeon pin) having a height of 62 mm and a cross-sectional area being a circle of 24 mm diameter. The metal sleeve had a wall thickness of 1.6 mm, enclosing a core of the aforesaid height and a diameter of 20.8 mm.

In order to determine its physical properties, the resulting gudgeon pin was cut open with obtainment of the following data:
tensile strength of the core: 15,2 N/mm$^2$
$E_{ax}$ module 21274 N/mm$^2$
thermal expansion coefficient $\alpha$(axial): $8,7.10^{-6}K^{-1}$
thermal expansion coefficient $\alpha$(radial): $8,7.10^{-6}K^{-1}$ The determined expansion coefficient was thus found to be even lower than that of a corresponding solid steel pin which is $$\alpha_{steel} = 12 \text{ to } 14 \times 10^{-6} K^{-1}.$$

This gudgeon pin was then tested successfully in a small motor for up to 800 hours. The motor used was a BERNARD Type 239 B single cylinder four stroke engine having a stroke volume of 181 cm$^3$. In this test, the motor was braked with a momentum of 4 to 6 kpm, which resulted in a rotation number of 3600 rpm. The test cycle comprised 9 hours of operation and 15 hours of rest. During operation, a temperature of 180° C. was measured in the center of the cylinder wall of the motor.

The above illustrates the use of a gudgeon pin according to the invention in an internal combustion engine. It will be understood, that the compound structure of pins according to the invention is equally suitable for other oscillating machine parts and that such parts are also comprised within the scope of the invention.

We claim:

1. A pin having a central longitudinal pin axis and being adapted for connecting machine elements with each other, which pin comprises a metal shell and a core therein, said core consisting essentially of fully hardened, oil-fast matrix system of an epoxide resin system having a glass transition temperature above 200° C. and at least about 55 percent by volume of the total core volume of a reinforcing granular filler material embedded in said system.

2. The pin of claim 1, wherein the amount of said granular filler in the core ranges from about 65 to about 70 percent by volume of the total core volume.

3. The pin of claim 1, wherein said granular filler is selected from quartz sand and amorphous quartz.

4. The pin of claim 1, wherein the thickness of the shell is in the range of from about 1 to 10% of the pin diameter.

5. The pin of claim 4, wherein the thickness of the shell is in the range of from 3 to 6% of the pin diameter.

6. The pin of claim 1, wherein the epoxide resin system is a fully cured mixture of
   (a) polyfunctional epoxide resin monomer,
   (b) hardener therefor, and
   (c) from 0 parts by weight to an effective amount of catalyst.

7. The pin of claim 6, wherein the
component (a) is selected from the group consisting of
   triglycidyl isocyanurate,
   1,1,2,2-tetra(4-glycidyloxy-phenyl)-ethane,
   1,1,3-tri(4-glycidyloxy-phenyl)-propane,
   epoxynovolak,
   N,N,N',N'-tetraglycidyl-4,4'-diaminodiphenylmethane and
   N,N,O-triglycidyl-p-hydroxyaniline;
component (b) is selected from the group consisting of
   methylnadic anhydride (methyl-norbornen-2,3-dicarboxylic anhydride),
   nadic anhydride (norbornen-2,3-dicarboxylic phthalic anhydride, /anhydride),
   benzophenone tetracarboxylic dianhydride,
   pyromellitic dianhydride,
   hexahydrophthalic anhydride,
   maleic anhydride,
   diaminodiphenylmethane and
   diaminodiphenylsulfone; and
component (c) is a catalyst selected from the group consisting of
   N-methylimidazole, 2-phenylimidazole and
   N,N-dimethyl-benzylamine.

8. The pin of claim 7, wherein component (a) consists of 100 parts by weight of triglycidyl isocyanurate,
   the hardener component (b) amounts to from 130 to 190 parts
   by weight, and component (c) amounts to from 0 to 4 parts by weight.

9. The pin of claim 8, wherein component (b) is methylnadic anhydride.

10. The pin of claim 8, wherein component (b) is hexahydrophthalic anhydride.

11. The pin of claim 8, wherein component (b) is maleic anhydride.

12. The pin of claim 24, wherein component (c) is N,N-dimethyl-benzylamine present in an amount of from 0.5 to one part by weight.

13. The pin of claim 8, wherein component (c) is 1-methylimidazole present in an amount of from 0.5 to one part by weight.

* * * * *